(12) United States Patent
Koch et al.

(10) Patent No.: US 10,976,203 B2
(45) Date of Patent: Apr. 13, 2021

(54) THERMOCOUPLE CONNECTOR

(71) Applicant: K-TEC SYSTEMS, INC., Ferndale, MI (US)

(72) Inventors: Cathy Koch, Pleasant Ridge, MI (US); Philip M. Martin, Pleasant Ridge, MI (US); Omar El-Qawasmeh, Royal Oak, MI (US)

(73) Assignee: K-TEC SYSTEMS, INC., Ferndale, MI (US)

( * ) Notice: Subject to any disclaimer, the term of this patent is extended or adjusted under 35 U.S.C. 154(b) by 34 days.

(21) Appl. No.: 16/378,093

(22) Filed: Apr. 8, 2019

(65) Prior Publication Data

US 2020/0319036 A1 Oct. 8, 2020

(51) Int. Cl.
*G01K 7/02* (2021.01)
*H01R 24/28* (2011.01)
*H01R 13/58* (2006.01)
*H01R 13/50* (2006.01)
*H01R 13/66* (2006.01)

(52) U.S. Cl.
CPC ........... *G01K 7/023* (2013.01); *H01R 13/501* (2013.01); *H01R 13/5829* (2013.01); *H01R 13/6683* (2013.01); *H01R 24/28* (2013.01); *H01R 2201/20* (2013.01)

(58) Field of Classification Search
CPC .............. H01R 13/5829; H01R 4/2433; H01R 4/2406; G01K 7/21; G01K 7/04; G01K 7/08
USPC .................. 439/656, 409, 410, 467; 374/181
See application file for complete search history.

(56) References Cited

U.S. PATENT DOCUMENTS

| | | | | |
|---|---|---|---|---|
| 4,767,361 A * | 8/1988 | Hoshino | ............ | H01R 13/422 439/596 |
| 4,842,546 A * | 6/1989 | Song | .................... | H01R 4/2404 439/409 |
| 6,183,304 B1 * | 2/2001 | Hollander | .............. | G01K 7/023 333/181 |
| 6,508,679 B2 * | 1/2003 | Han | ......................... | H01R 4/46 439/488 |
| 6,843,682 B2 * | 1/2005 | Matsuda | ................. | H01R 4/48 439/459 |

(Continued)

FOREIGN PATENT DOCUMENTS

EP 1533869 5/2005

OTHER PUBLICATIONS

TEMPREL Thermocouple Parts, 4 pgs. photos, (Prior Art), 1972.

*Primary Examiner* — Hien D Vu
(74) *Attorney, Agent, or Firm* — Brooks Kushman, P.C.

(57) ABSTRACT

A thermocouple apparatus including a one-piece connector with a terminal header portion that defines a pair of openings on a front end, and a clam shell portion including a cap and a base connected on one side with a hinge to the cap. A pair of terminals are partially disposed within the pair of openings defined by the terminal header portion and extend into a cavity defined between the cap and the base. The pair of terminals may be a pair of prongs or may be a pair of receptacles. A pair of leads from a probe or a pair of leads that are part of an electrical connection to temperature measurement equipment extend through a lead wire opening and into the cavity. The cap clamps each one of the leads to one of the pair of terminals when the cap is in the closed position.

13 Claims, 12 Drawing Sheets

(56) References Cited

U.S. PATENT DOCUMENTS 7,297,016 B1\* 11/2007 Tymkewicz ........... G01K 7/023
439/459
2004/0255998 A1\* 12/2004 Schuh ................... G01K 7/13
136/224

\* cited by examiner

THERMOCOUPLE CONNECTOR

TECHNICAL FIELD

This disclosure relates to sets of thermocouple connectors that include a thermocouple probe connector and a thermocouple wiring connector.

BACKGROUND

Thermocouples are used to measure temperature in a wide variety of testing systems. For example, in automotive test labs hundreds of thermocouple connectors may be used to sense the temperature of many different components of a vehicle.

Prior art thermocouple connectors generally require a plurality of components to be assembled with fasteners such as screws that are used to connect the leads from a thermocouple probe to the leads of an electrical wire that provides temperature data to an electrical test device. Assembling the connectors including a plurality of separate parts with screws is labor-intensive and time-consuming.

One-piece molded connectors have been proposed that are expensive to manufacture and lack flexibility. The leads of the probe and the receptacle lead wiring must be connected by soldering or crimping before the connectors are molded around the leads and connectors. Molded connectors require a substantial investment in injection molding machines and dies. Connectors with molded bodies are not capable of being easily disassembled and cannot be serviced if there is a problem with the thermocouple.

This disclosure is directed to solving the above problems and other problems as summarized below.

SUMMARY

According to one aspect of this disclosure, a thermocouple apparatus is disclosed that includes a positive lead and a negative lead formed of different metals and a positive terminal and a negative terminal each having an interface end and a lead connection end. A connector includes a terminal header, a base and a cap with the cap being connected to the base by a hinge. The connector receives the positive lead and the negative lead in an opening defined by the base and the cap. The terminal header defines a positive terminal opening for receiving the positive terminal and a negative terminal opening for receiving the negative terminal. The cap is closed over the base to press the positive lead into electrically conducting contact with the positive lead connection end of the positive terminal. The cap also presses the negative lead into electrically conducting contact with the negative lead connection end of the negative terminal.

According to another aspect of this disclosure, a thermocouple apparatus is disclosed that includes a one-piece connector. The one-piece connector includes a terminal header portion that defines a pair of openings on a front end, and a clam shell portion including a cap and a base connected on one side to the cap. The cap and base each partially define a lead wire opening when the cap is in a closed position with the cap contacting the base. A pair of terminals are partially disposed within the pair of openings defined by the terminal header portion and extend into a cavity defined between the cap and the base. A pair of leads extend through the lead wire opening and into the cavity. The cap connects each one of the pair of leads to one of the pair of terminals when the cap is in the closed position.

According to a further aspect of this disclosure, a thermocouple apparatus including a plug connector and a receptacle connector is provided for connecting a thermocouple probe to an electrical connection wire. The apparatus includes a male connector and a female connector that each include a one-piece body including a terminal header portion that defines a pair of openings on an interface end, a clam shell portion including a cap and a base hinged on one side to the cap. The cap and base define an outer end opening when the cap is in a closed position with the cap closed over and contacting the base. A pair of terminal prongs extend outwardly from one of a first pair of outer end openings defined by the terminal header of the male connector and are partially disposed within one of the pair of openings defined by the terminal header portion of the male connector. The terminal prongs extend into a cavity defined between the cap and the base of the clam shell portion. A pair of probe leads extend from the probe to the pair of terminal prongs through the interface end opening and into the cavity of the male connector. The cap connects each of the pair of probe leads to the pair of terminal prongs when the cap is in the closed position. A pair of terminal receptacles are disposed partially within a second pair of interface end openings defined by the terminal header portion of the female connector. The pair of terminal receptacles extend into a cavity defined between the cap and the base of the clam shell portion of the female connector. A pair of wiring leads of the electrical connection wire extend through a second outer end opening and into the cavity of the female connector. The cap connects each one of the wiring leads to one of the terminal receptacles of the female connector when the cap is in the closed position.

According to other aspects of this disclosure, the base may include a positive terminal relief surface and a negative terminal relief surface. The cap may include a positive pressing element and a negative pressing element that apply pressure to the positive lead and the negative lead and the positive lead connection end and the negative lead connection end. The pressing elements deflect the lead connection ends toward the positive terminal relief surface and the negative terminal relief surface. The positive and negative lead connection ends may be concave and are received in and secured within the positive and negative lead connection ends. The positive and negative lead connection ends may each define a locking slot and the cap may include a wall that engages the locking slot to secure the positive terminal and the negative terminal inside the terminal header when the cap is closed over the base.

According to other aspects of this disclosure, the positive and negative lead connection ends may be planar, and the positive lead and the negative lead may be received on the positive and negative lead connection ends. The positive and negative lead connection ends may be deflected towards a positive terminal relief surface and a negative terminal relief surface. A one-way locking tooth may protrude from each of the positive terminal and the negative terminal. The locking teeth are adapted to engage recesses defined by the terminal header to prevent removal of the terminals. The positive terminal and the negative terminal may be split quadrilateral tubular receptacles.

The thermocouple apparatus may comprise a thermocouple probe enclosing the positive and negative leads. An electrical connection wire includes the positive lead and the negative lead.

On the plug side connector, the positive terminal and the negative terminal may include a prong that extends from one side of the terminal header. On the receptacle side, the positive terminal and the negative terminal may be tubular receptacles that are disposed at least partially within the terminal header with the tubular receptacles being adapted to receive one of the prongs.

The thermocouple apparatus may comprise a first latch part, or latch, provided on the cap and a second latch part, or latch receiver, provided on the base. The first latch part engages the second latch part to secure the cap to the base.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale, and some features may be exaggerated or minimized to show details of particular components. The specific structural and functional details disclosed are not to be interpreted as limiting, but as a representative basis for teaching one skilled in the art how to practice the disclosed concepts. As those of ordinary skill in the art will understand, various features illustrated and described with reference to any one of the figures may be combined with features illustrated in one or more other figures to produce embodiments that are not explicitly illustrated or described. However, various combinations and modifications of the features consistent with the teachings of this disclosure may be desired for particular applications or implementations.

Figure 1:
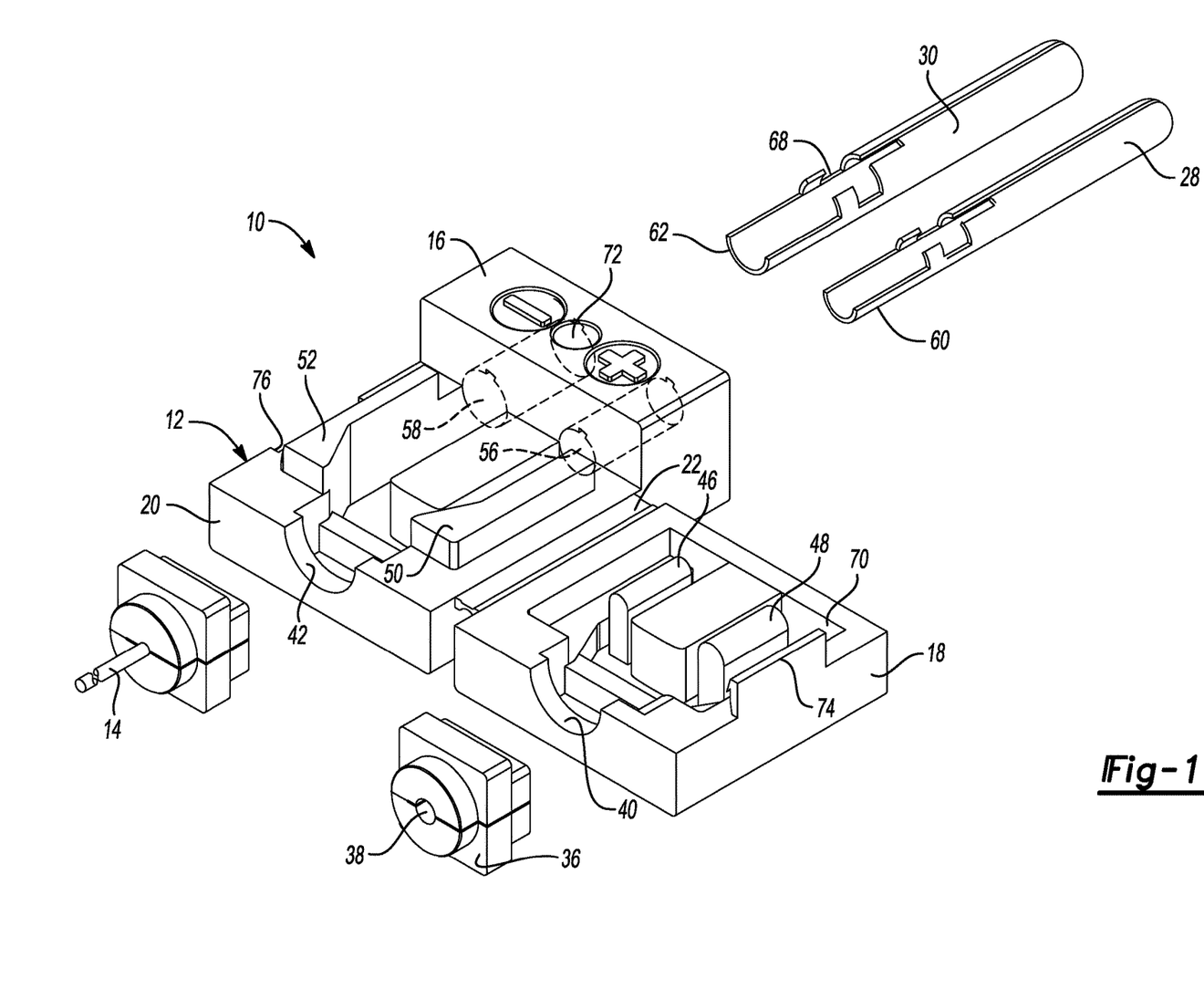
FIG. 1 is an exploded perspective view of a standard size male thermocouple assembly with cylindrical tubular pins.
Figures 2, 3:
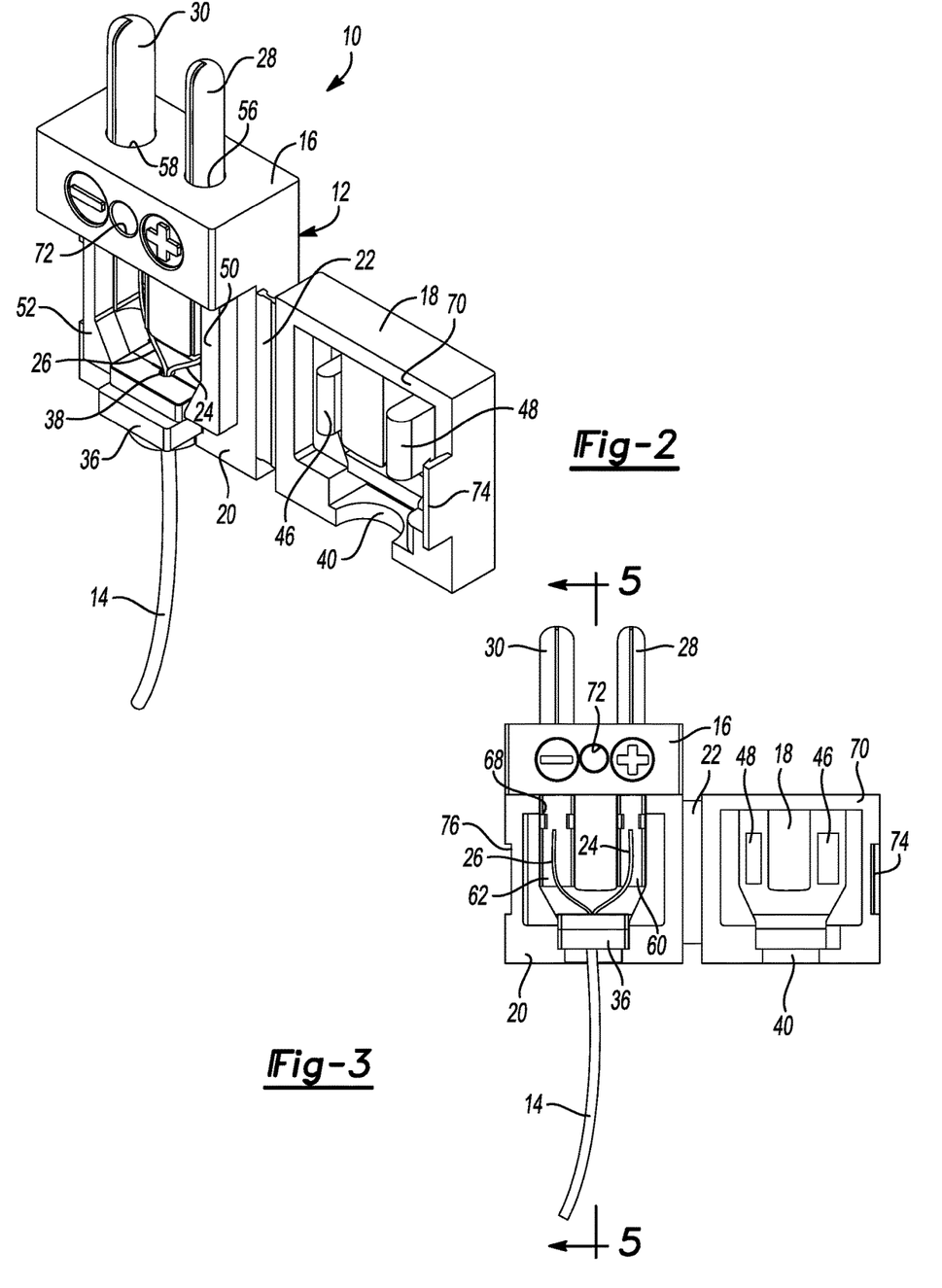
FIG. 2 is a perspective view of the embodiment of FIG. 1 shown with the cap open.
FIG. 3 is a plan view of the embodiment of FIG. 1 shown with the cap open.

Referring to FIGS. 1-3, a male thermocouple apparatus 10 is illustrated that includes a connector body 12 that is a one-piece injection molded member. The connector body 12 is assembled to a thermocouple probe 14 that is used to measure temperature, for example, in temperature measurement equipment. The connector body 12 includes a terminal header 16, a cap 18, and a base 20. The cap 18 is connected to the base 20 by a living hinge 22. The cap 18 pivots about the living hinge 22 between an open position as shown in FIGS. 1-3 and a closed position (similar to FIG. 8 below) wherein the cap 18 is closed over the base 20. Other types of hinges may be used instead of the living hinge 22 such as a steel spring clip hinge.

The probe 14 encloses a positive probe lead 24 and a negative probe lead 26 that extend the length of the probe 14. As is well known in the art, the positive and negative probe leads 24 and 26 are formed from two different metals, for example, the negative probe lead 24 may be Alumel® a trademark of Conceptech, Inc. and the positive probe lead 30 may be Chromel® a trademark of Conceptech, Inc. Different types of thermocouple wires may be used depending upon the temperature to be sensed and environmental conditions. The materials used for the prongs 28 and 30, the probe leads 24 and 26 extending from the thermocouple 10, and the wires extending to the temperature measurement equipment are made of two different matching alloys.

A grommet 36 is assembled between the probe 14 and the connector body 12. The grommet 36 provides a seal between the probe 14 and the connector body 12. The grommet 36 defines a hole 38 through which the positive and negative probe leads 24 and 30 are routed from inside the tip of the probe 14 to the inside of the connector body 12.

Figure 4:
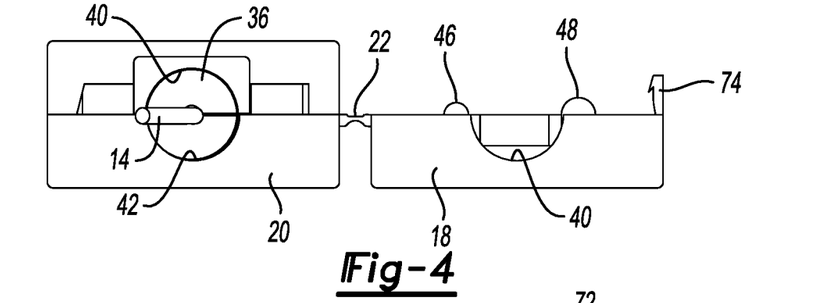
FIG. 4 is an end elevation view of the embodiment of FIG. 1 shown with the cap open.

Referring to FIGS. 1 and 4, the grommet 36 may be partially split to facilitate assembling the probe 14 inside the grommet 36. The cap 18 defines a cap access opening 40 and the base 20 defines a base access opening 42. In the illustrated embodiment, the cap and base access openings 40 and 42 are semi-circular in cross-section but other shapes may be provided depending upon the desired shape of the grommet 36.

Referring to FIGS. 1-4, the cap 18 includes a first pressing element 46 and a second pressing element 48. When the cap 18 is closed over the base 20, the first pressing element 46 is disposed over a positive terminal relief surface 50 and the second pressing element 48 is disposed over a negative terminal relief surface 52.

Referring to FIGS. 1-5, the header 16 defines a positive terminal opening 56 and a negative terminal opening 58. The positive terminal prong 28 and the negative terminal prong 30 are inserted into the positive terminal opening 56 and the negative terminal opening 58. The positive terminal prong 28 includes a positive lead connection end 60 and the negative terminal prong 30 includes a negative lead connection end 62. When the cap 18 is closed over the base 20 in a closed position, the pressing element 46 presses the positive probe lead 24 against the positive lead connection end 60 of the positive terminal prong 28 and causes the positive lead connection end 60 to be deflected towards positive terminal relief surface 50. When the cap 18 is closed, the pressing element 48 presses the negative probe lead 26 against the negative lead connection end 62 of the negative terminal prong 30 and causes the negative lead connection end 62 to be deflected towards the negative terminal relief surface 52. Deflection of the lead connection ends 60 and 62 creates a spring biasing force that clamps the lead connection ends 60 and 62 to the probe leads 24 and 26.

Figure 5:
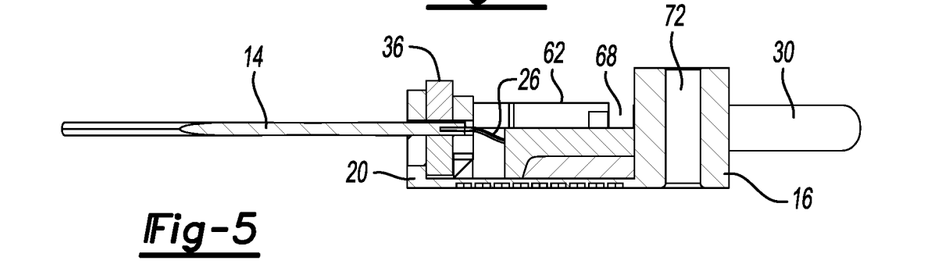
FIG. 5 is a cross-section view taken along the line 5-5 in FIG. 3.

Referring to FIGS. 3 and 5, a locking slot 68 is defined by each of the positive and negative terminal prongs 28 and 30. The slot 68 receives a wall 70 of the cap 18 to lock the terminal prongs 28 and 30 in the connector body 12. Other locking features may be provided such as a locking tooth received in a recess, or the like.

Referring to FIGS. 1-4, an opening 72 may be provided in the header 16 that is adapted to receive a cable tie (not shown) or a fastener to secure more than one thermocouple 10 together or to secure the thermocouple 10 to a support or bracket with a fastener (not shown). A latch 74 and a latch receiver 76 are provided on the cap 18 and the base 20, respectively, to hold the connector body 12 in the closed position.

Figure 6:
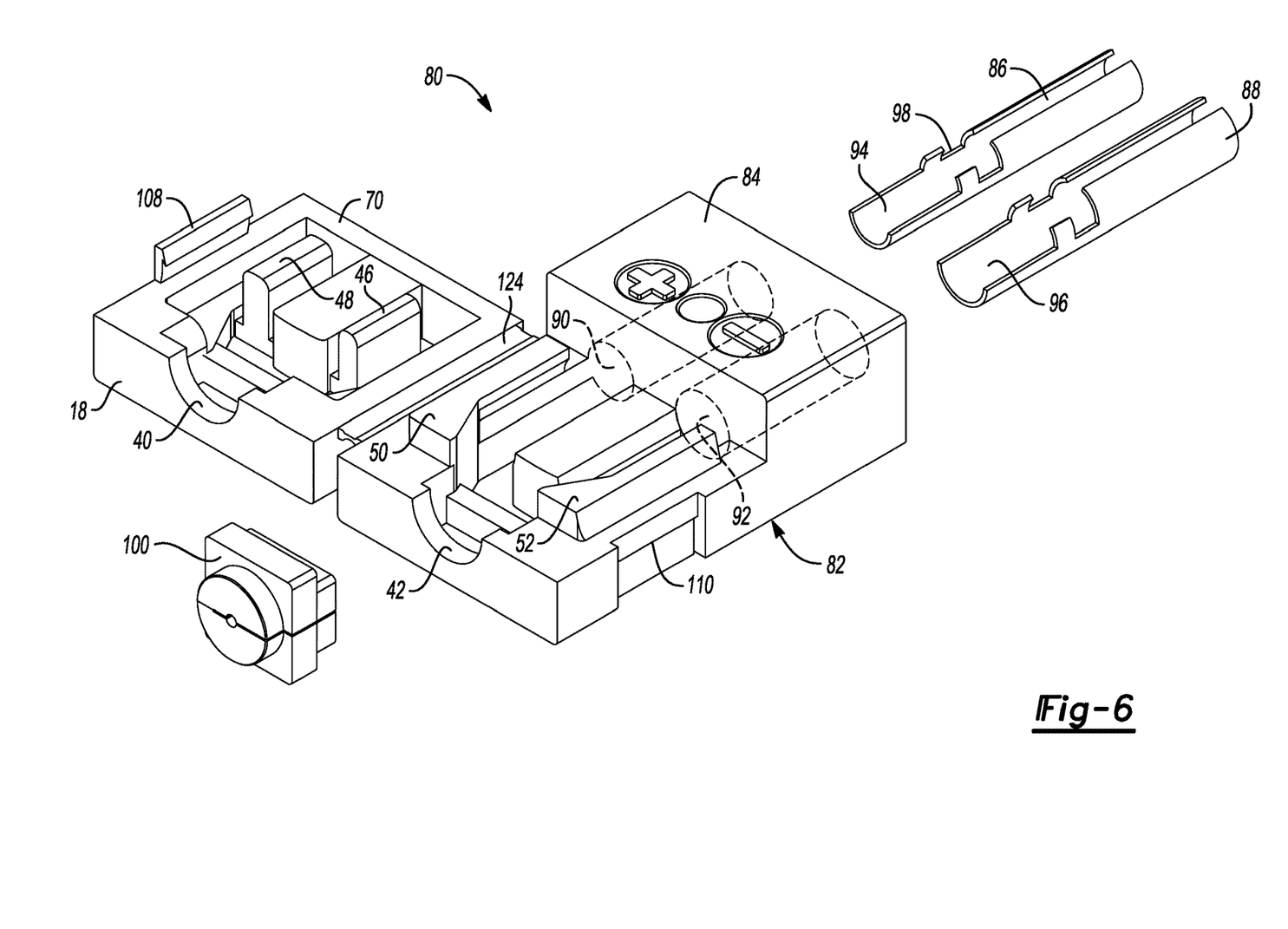
FIG. 6 is an exploded perspective view of a standard size female thermocouple assembly with cylindrical tubular pin receptacles.
Figure 7:
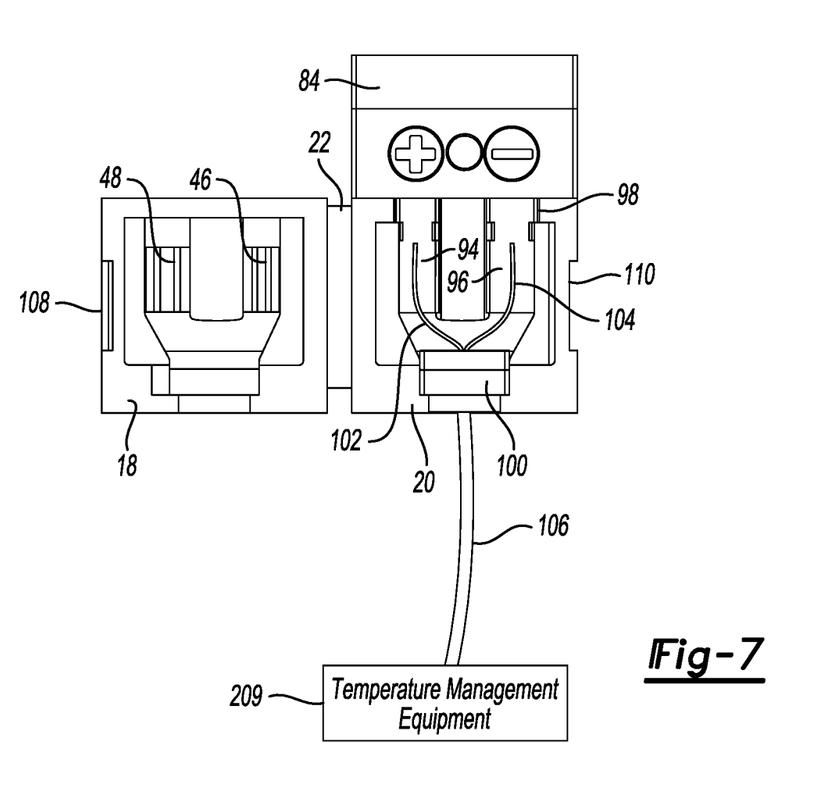
FIG. 7 is a plan view of the embodiment of FIG. 6 shown with the cap open.

Referring to FIGS. 6 and 7, a female thermocouple apparatus 80 is illustrated that is adapted to be used with the male thermocouple apparatus 10 described with reference to FIGS. 1-5. The connector body 82 is functionally identical to connector body 12 and the above description is incorporated by reference. Reference numerals of similar parts of the connector bodies 12 and 82 are carried over for the embodiment of FIGS. 6-10.

The female connector body 82 includes a terminal header 84 that is elongated to receive a positive terminal receptacle 86 and a negative terminal receptacle 88. The header 84 defines a positive pin receptacle opening 90 and a negative pin receptacle opening 92. The positive terminal receptacle 86 and the negative terminal receptacle 88 are hollow cylindrical tubular members that include a positive lead connection end 94 and a negative lead connection end 96.

The positive terminal receptacle 86 and the negative terminal receptacle 88 each define a locking slot 98 that is adapted to receive the wall 70 of the cap 18 when the cap is closed.

A grommet 100 is assembled to the cap access opening 40 and the base access opening 42. The grommet 100 receives the positive lead 102 and the negative lead 104 that are enclosed by an electrical connection wire 106. The wire 106 is connected to temperature measurement equipment 107, as is well known in the art.

The positive lead 102 and the negative lead 104 are connected to the positive lead connection end 94 and the negative lead connection end 96. When the cap 18 is closed, the pressing elements 46 and 48 press the leads 102 and 104 against the lead connection ends 94 and 96 of the terminal receptacles 86 and 88. The pressing elements 46 and 48 deflect the lead connection ends 102 and 104 towards the terminal relief surfaces 50 and 52. Deflection of the lead connection ends 94 and 96 creates a spring biasing force that clamps the leads 102 and 104 between the pressing elements 46 and 48 the lead connection ends 94 and 96. The cap pivots about living hinge 22 that is molded with the base 20 and the cap 18 and keeps the base 20 and cap 18 connected as the cap 18 is moved between the open and closed positions.

Figure 8:
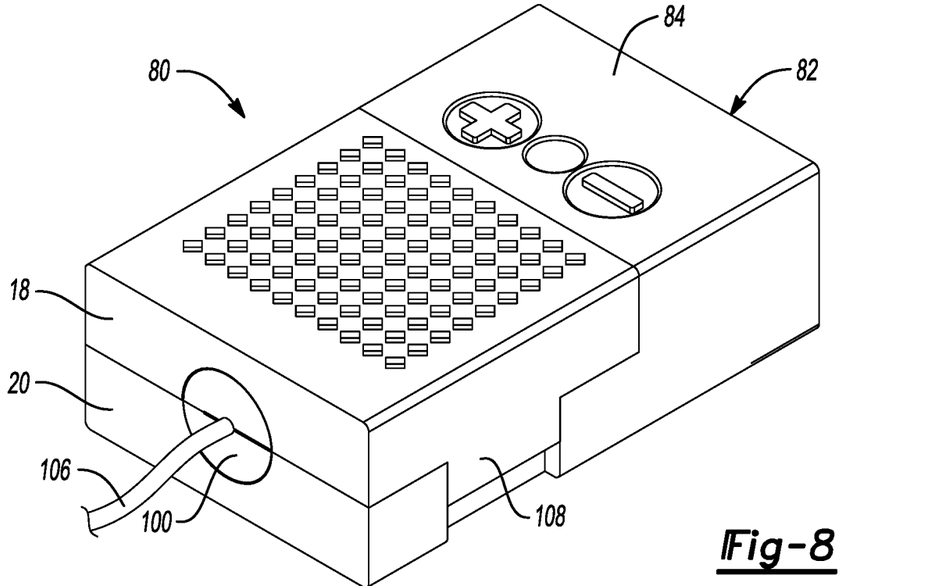
FIG. 8 is a perspective view of the embodiment of FIG. 6 with the cap closed.

Referring to FIG. 8, the female thermocouple apparatus 80 is shown with the cap 18 in the closed position overlying the base 20. As shown in FIG. 7, a latch 108 is provided on the cap 18 and a latch receiver 110 is provided on the base 20 to clip the cap 18 to the base 20 in the closed position. The latch 108 and latch receiver 110 are provided on the opposite side of the connector body 82 from the hinge 22.

The male connector body 12 shown in FIGS. 1-5 also includes the latch 108 and latch receiver 110 on the opposite side of the connector body 12 from the hinge 22. The grommet 100 for the electrical connection wire 106 is shown as it is assembled into the cap access opening 40 and the base access opening 42.

Figure 9:
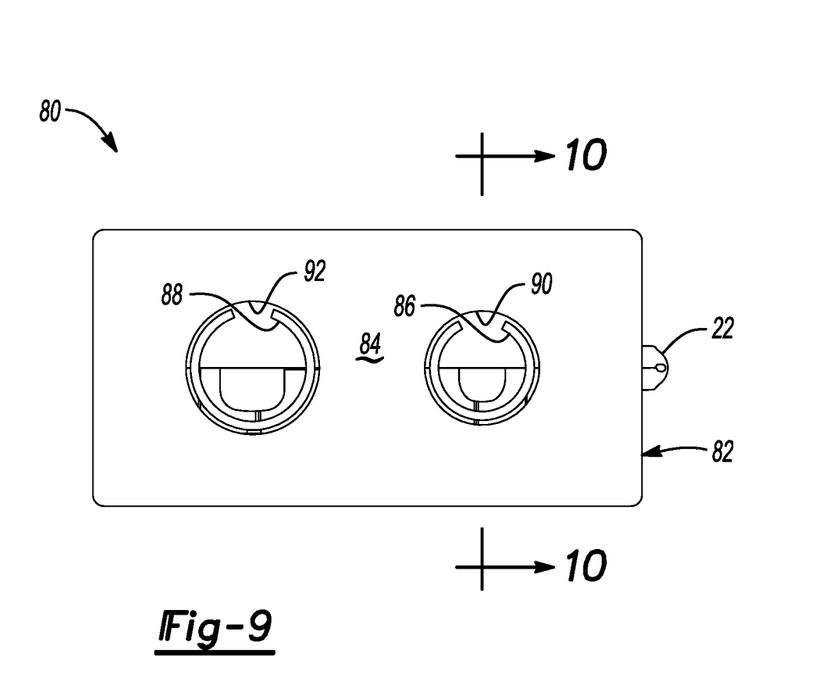
FIG. 9 is an end view of the embodiment of FIG. 6 shown with the cap open.
Figure 10:
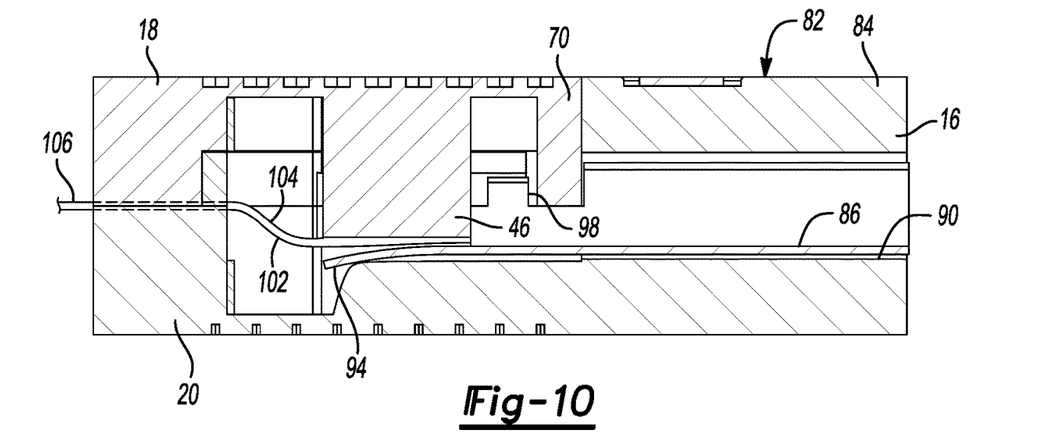
FIG. 10 is a cross-section view taken along the line 10-10 in FIG. 9.

Referring to FIGS. 9 and 10, the connector body 82 is shown in its closed position from the terminal header 84 end with the hinge 22 closed and the terminal receptacles 86 and 88 disposed in the positive and negative receptacle openings 90 and 92. In FIG. 10, the positive and negative leads 102 and 104 are show as they extend from the electrical connection wire 106 and into the cavity defined between the cap 18 and the base 20. The first pressing element 46 engages the positive lead 102, deflects the positive lead connection end 94 toward the positive terminal relief surface 50. A gap 109 is defined below the lead connection ends 94 and 96 and above the terminal relief surfaces 50 and 52. Note, the directional terms "above" and "below" refer to the positions of the parts as shown in the drawings.

With continued reference to FIG. 10, the positive terminal receptacle 86 is shown being locked into the terminal header 16 by the wall 70 of the cap 18 being received in the locking slot 98.

Figure 11:
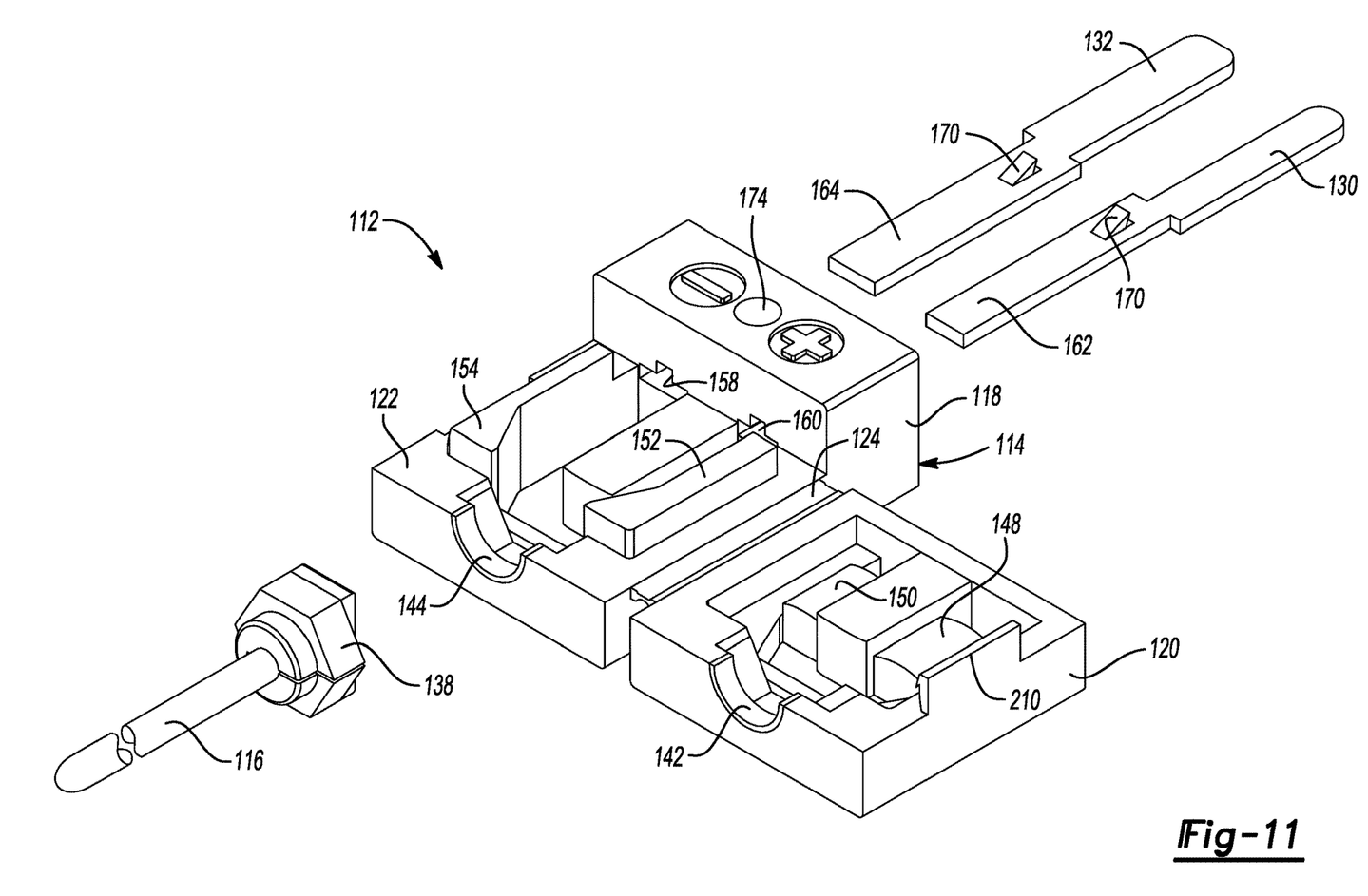
FIG. 11 is an exploded perspective view of a miniature male thermocouple assembly with planar pins.
Figure 12:
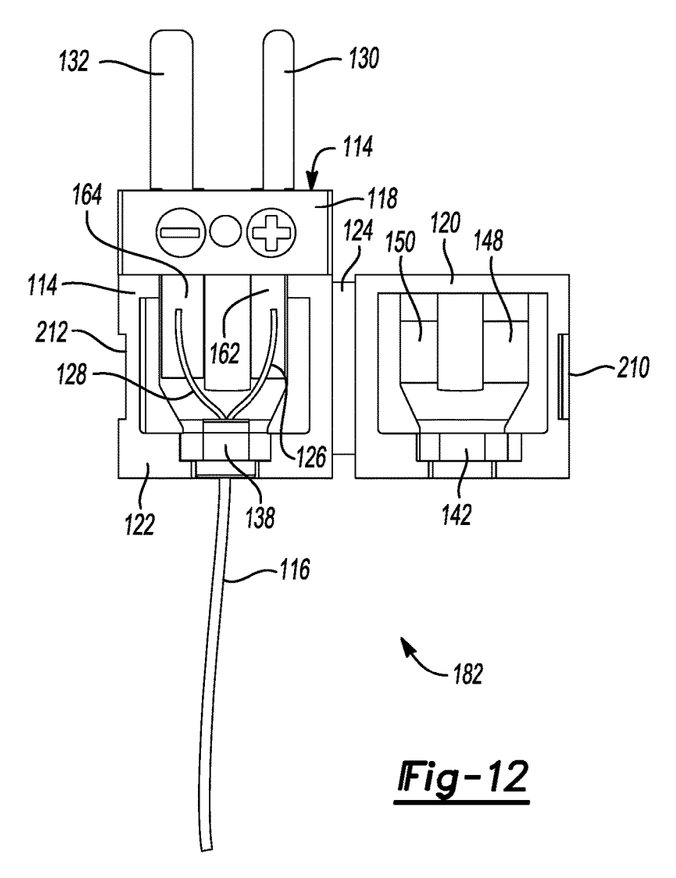
FIG. 12 is a plan view of the embodiment of FIG. 11 shown with the cap open.
Figure 13:
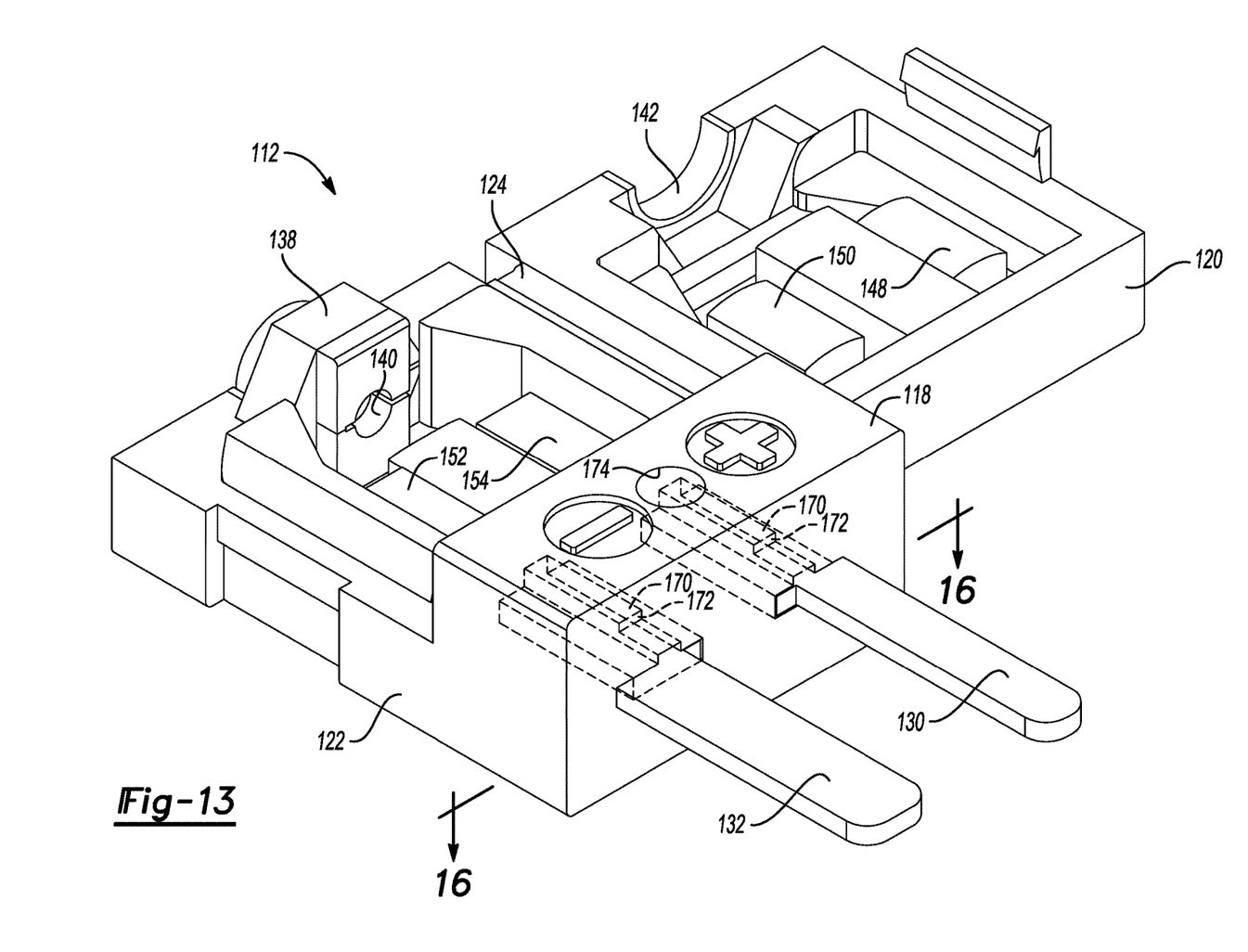
FIG. 13 is a perspective view of the embodiment of FIG. 11 shown with the cap open.
Figure 14:
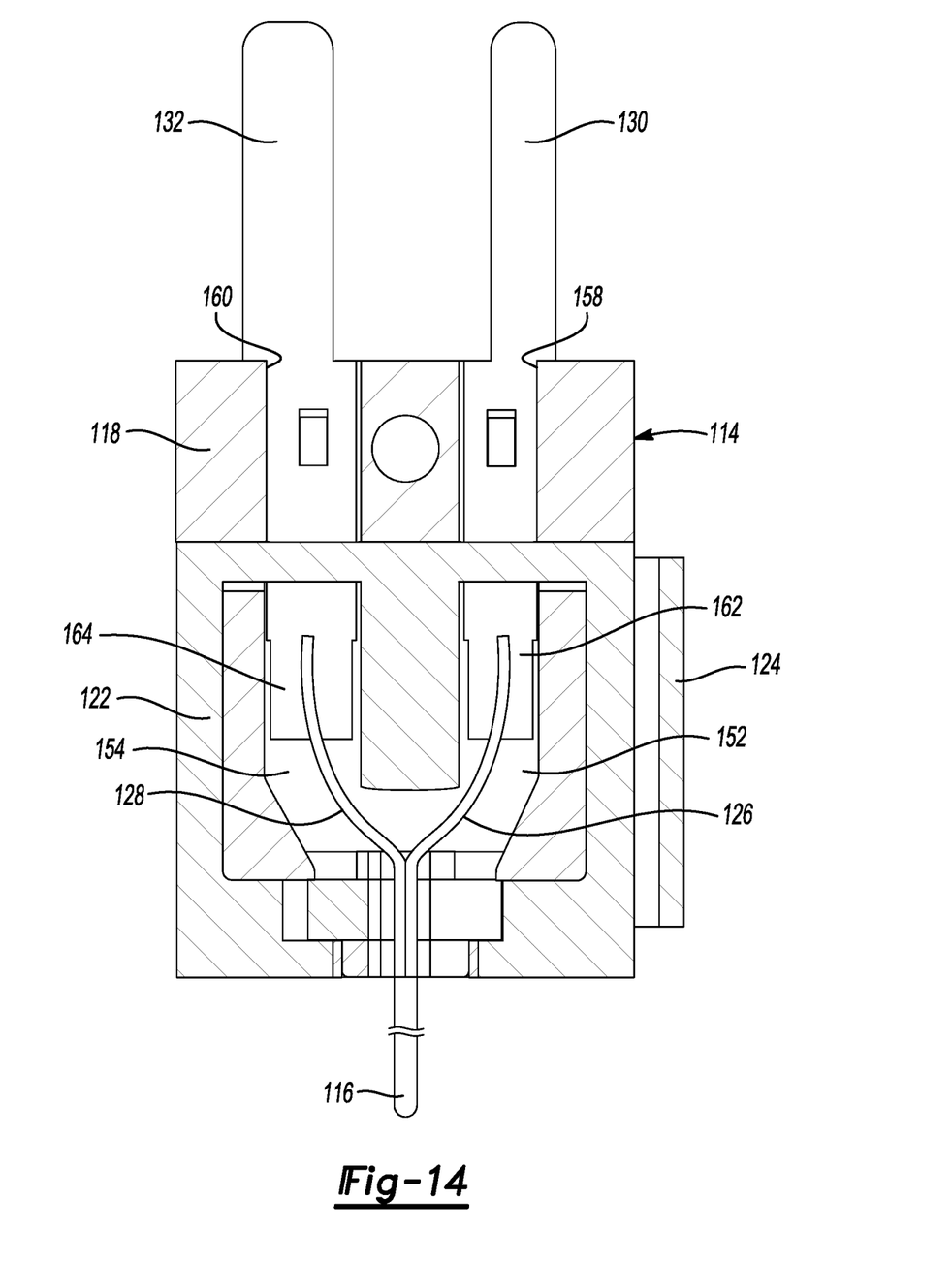
FIG. 14 is a cross-sectional view taken along the line 16-16 in FIG. 13.

Referring to FIG. 11, a miniature male thermocouple apparatus 112 is illustrated that includes a one-piece molded connector body 114. The connector body 114 is assembled to a thermocouple probe 116. The connector body 114 includes a terminal header 118, a cap 120, and a base 122. The cap 120 is connected to the base 122 by a living hinge 124. The cap 120 pivots about the hinge 124 between an open position as shown in FIGS. 11-13 and a closed position with the cap 120 is closed over the base 122. Instead of the living hinge 124, other types of hinges may be used to pivotally connect the cap 12 to the base 122.

Referring to FIG. 12, the probe 116 encloses a positive probe lead 126 and a negative probe lead 128 that extend the length of the probe 116. The materials used for the prongs 130 and 132, wires extending to the temperature measurement equipment 209 (shown in FIG. 12 are selected to match the materials of the probe leads 126 and 128.

A grommet 138 is assembled between the probe 116 and the connector body 114. The grommet 138 provides a seal between the probe 116 and the connector body 114. The grommet 138 defines a hole 140 (shown in FIG. 13) through which the positive and negative probe leads 126 and 130 are routed from inside the tip of the probe 116 to a cavity defined inside the connector body 114.

Referring to FIGS. 11 and 13, the grommet 138 may be partially split to facilitate assembling the probe 116 inside the grommet 138. The cap 120 defines a cap access opening 142 and the base 122 defines a base access opening 144. In the illustrated embodiment, the cap and base access openings 142 and 144 are semi-circular in cross-section but other shapes may be provided depending upon the shape of the grommet 138.

The grommet 138 is shown as it is assembled into the cap access opening 142 and the base access opening 144.

Referring to FIGS. 11-14, the cap 120 includes a first pressing element 148 and a second pressing element 150. When the cap 120 is closed over the base 122, the first pressing element 148 is disposed above a negative terminal relief surface 154 and the second pressing element 150 is disposed above a positive terminal relief surface 152.

Referring to FIGS. 11-15, the header 118 defines a positive terminal opening 158 and a negative terminal opening 160. The positive terminal prong 130 and the negative terminal prong 132 are inserted into the positive terminal opening 158 and the negative terminal opening 160. The positive terminal prong 130 includes a positive lead connection end 162 and the negative terminal prong 132 includes a negative lead connection end 164.

When the cap 120 is closed over the base 122 in a closed position, the pressing element 148 presses the positive probe lead 126 against the positive lead connection end 162 of the positive terminal prong 130 and causes the prong 130 to be deflected towards the positive terminal relief surface 152. The pressing element 150 presses the negative probe lead 128 against the negative lead connection end 164 of the negative terminal prong 132 and causes the prong 132 to be deflected towards the negative terminal relief surface 154. Deflection of the lead connection ends 162 and 164 creates a spring biasing force that clamps the lead connection ends 162 and 164 to the probe leads 126 and 128, and against the pressing elements 148 and 150.

Referring to FIGS. 11, and 13-15, a locking tooth 170 is provided on each of the positive and negative terminal prongs 130 and 132. The locking tooth 170 is received in a locking recess 172 to lock the terminal prongs 130 and 132 in the connector body 114.

Figures 15, 17:
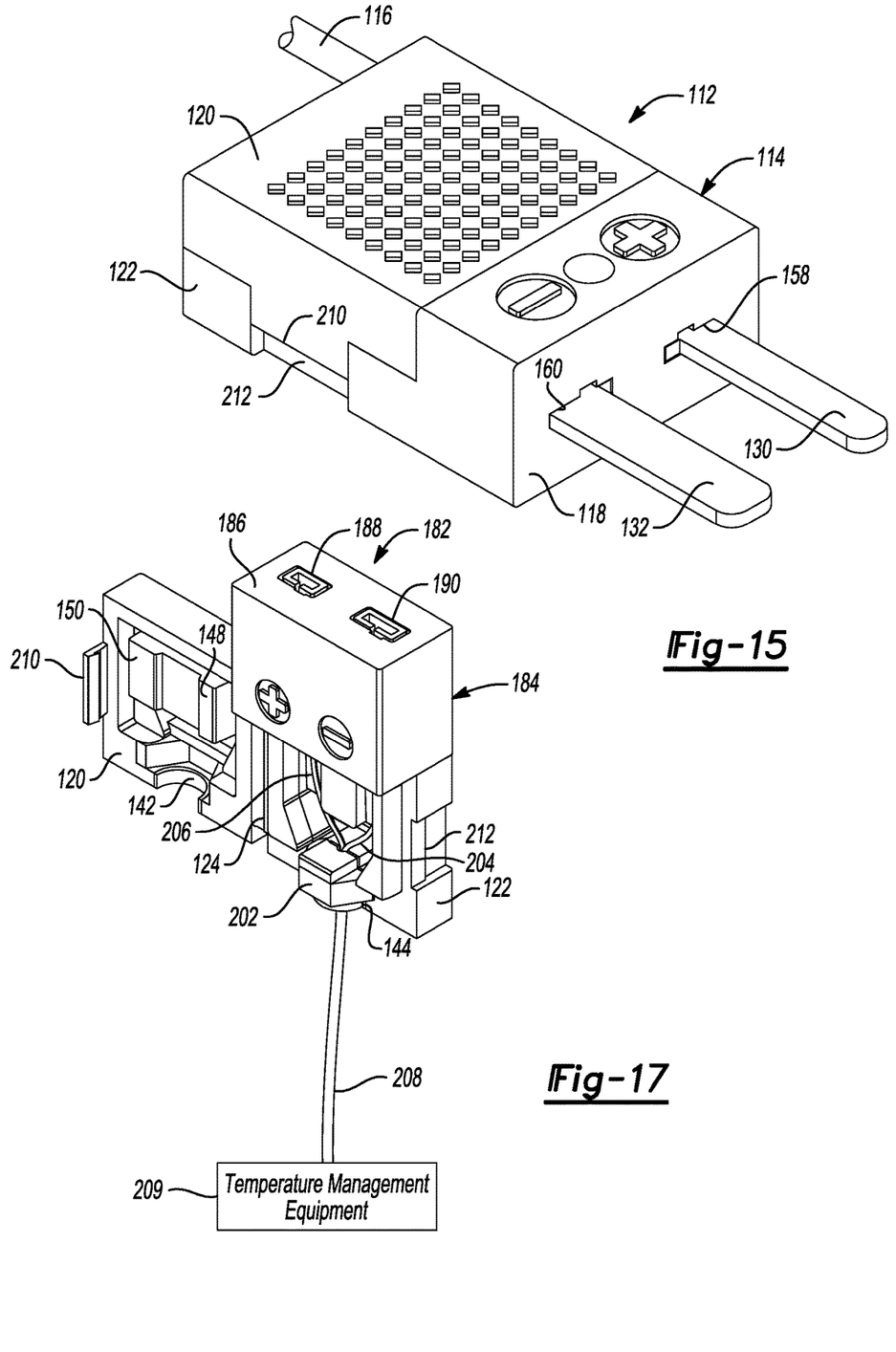
FIG. 15 is a perspective view of the embodiment of FIG. 11 with the cap closed.
FIG. 17 is a perspective view of the embodiment of FIG. 16 shown with the cap open.

Referring to FIG. 15, the male miniature thermocouple 114 is shown in the closed position. A latch 210 is provided on the cap 120 and a latch receiver 212 is provided on the base 122 to clip the cap 112 to the base 122 in the closed position. The latch 210 and latch receiver 212 are provided on the opposite side of the connector body 114 from the hinge 124.

Figure 16:
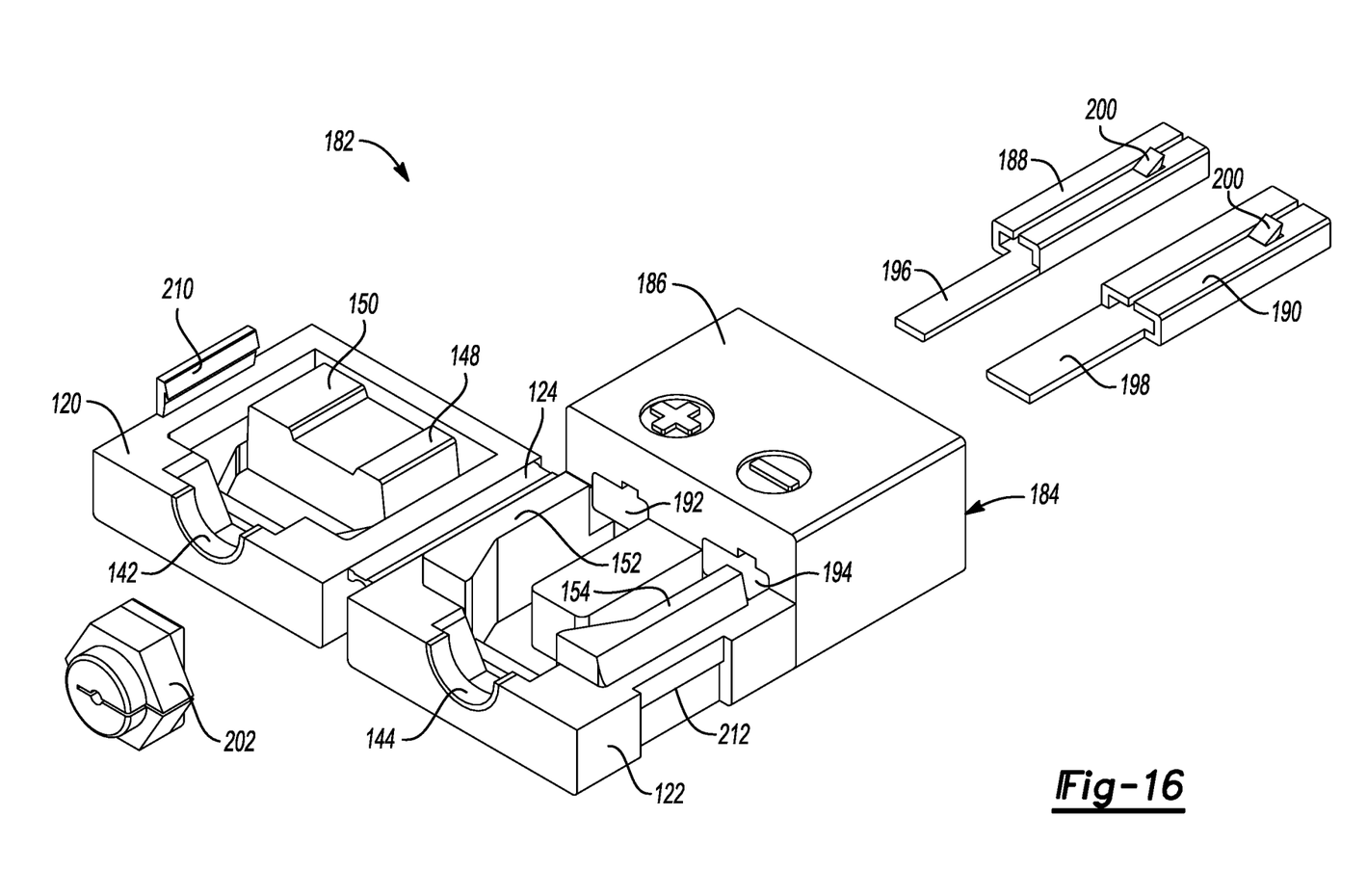
FIG. 16 is an exploded perspective view of a miniature female thermocouple assembly with split quadrilateral tubular pin receptacles.

Referring to FIGS. 16 and 17, a miniature female thermocouple apparatus 182 for the male thermocouple apparatus 112 described. The connector body 184 is similar in many respects to connector body 114. The reference numerals of similar parts of the connector bodies 114 and 184 in FIGS. 11-15 carried over in the embodiment of FIGS. 16-19.

The female connector body 184 includes a terminal header 186 that is elongated to receive a positive terminal receptacle 188 and a negative terminal receptacle 190. The header 186 defines a positive pin receptacle opening 192 and a negative pin receptacle opening 194. The positive terminal receptacle 188 and the negative terminal receptacle 190 are hollow, split, quadrilateral tubular members that include a positive lead connection end 196 and a negative lead connection end 198.

Figure 19:
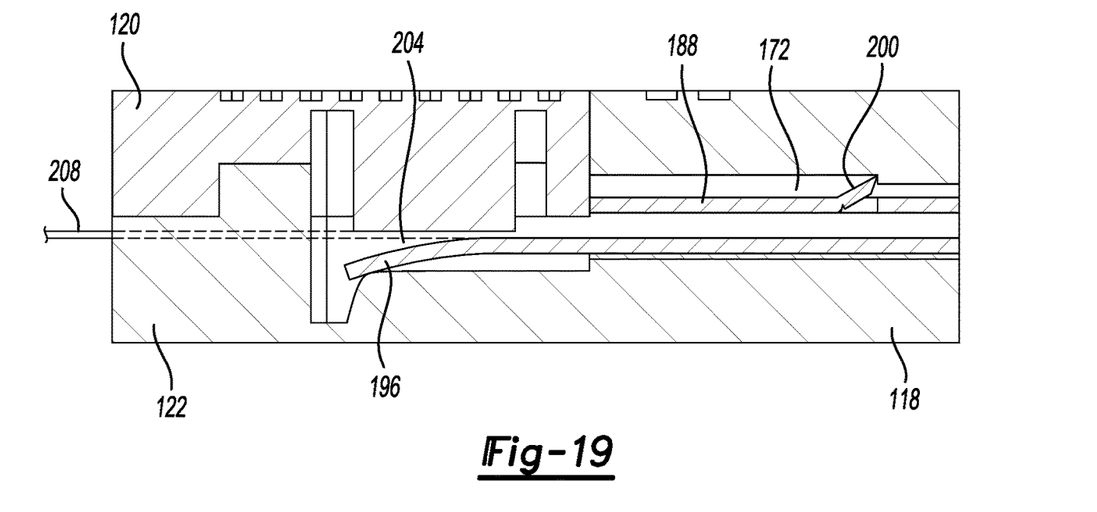
FIG. 19 is a cross-sectional view taken along the line 19-19 in FIG. 18.

The positive terminal receptacle 188 and the negative terminal receptacle 190 each define a locking tooth 200 that is adapted to be received in a recess 172 of the cap 120 (as shown in FIG. 19) when the cap 120 is closed.

A grommet 202 is assembled to the cap access opening 142 and the base access opening 144. The grommet 202 receives the positive lead 204 and the negative lead 206 that are enclosed by an electrical connection wire 208. The positive lead 204 and the negative lead 206 are connected to the positive lead connection end 196 and the negative lead connection end 198 as previously described with the first pressing element 148 and the second pressing element 150.

When the cap 120 is closed, the pressing elements 148 and 150 press the leads 204 and 206 against the lead connection ends 196 and 198 of the terminal receptacles 188 and 190. The pressing action causes the lead connection ends 196 and 198 to be deflected towards the terminal relief surfaces 152 and 154. Deflection of the lead connection ends 196 and 198 creates a spring biasing force that clamps the leads 204 and 206 between the pressing elements 148 and 150 the lead connection ends 196 and 198. The cap 120 pivots about living hinge 124 that is molded with the base 122 and the cap 120 and keeps the base 122 and cap 120 connected as the cap 120 is moved between the open and closed positions.

As shown in FIG. 17, a latch 210 is provided on the cap 120 and a latch receiver 212 is provided on the base 122 to clip the cap 120 to the base 122 in the closed position. The latch 210 and latch receiver 212 are provided on the opposite side of the connector body 184 from the hinge 124. The grommet 202 is shown as it is assembled into the cap 120 access opening 142 and the base access opening 144.

In FIG. 17, the positive and negative leads 204 and 206 are show as they extend from the electrical connection wire 208 and into the cavity defined between the cap 120 and the base 122. The first pressing element 148 engages the positive lead 206, deflects the positive lead connection end 196 toward the positive terminal relief surface 152. The wire 208 connects the thermocouples 80 and 182 to temperature measurement equipment 209.

Figure 18:
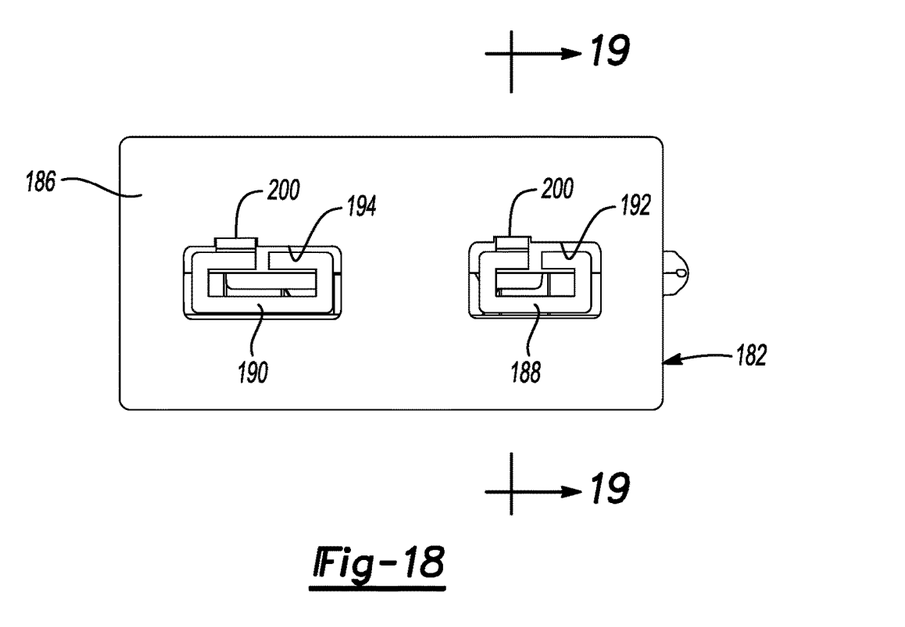
FIG. 18 is an end view of the embodiment of FIG. 16 shown with the cap closed.

Referring to FIGS. 18 and 19, the connector body 184 is shown in its closed position from the terminal header 186 end. The terminal receptacles 188 and 190 are disposed in the positive and negative receptacle openings 192 and 194. With continued reference to FIG. 19, the positive terminal receptacle 188 is shown being locked into the terminal header 118 by the locking tooth 200 of the cap 120 being received in the locking recess 172.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A thermocouple apparatus comprising:
    a positive lead and a negative lead formed of different metals;
    a positive terminal having a positive interface end and a positive lead connection end adapted to be connected to the positive lead;
    a negative terminal having a negative interface end and a negative lead connection end adapted to be connected to the negative lead; and
    a connector including a terminal header, a base and a cap, wherein the cap is connected to the base by a hinge, the connector receiving the positive lead and the negative lead in an opening defined by the base and the cap, wherein the terminal header defines a positive terminal opening for receiving the positive terminal and a negative terminal opening for receiving the negative terminal, wherein the cap is closed over the base to press the positive lead into electrically conducting contact with the positive lead connection end of the positive terminal and to press the negative lead into electrically conducting contact with the negative lead connection end of the negative terminal, and wherein the positive and negative leads are received in and secured within the positive and negative lead connection ends, and wherein the positive and negative lead connection ends each further define a locking slot, wherein the cap includes a wall that engages the locking slot to secure the positive terminal and the negative terminal inside the terminal header when the cap is closed over the base.

2. The thermocouple apparatus of claim 1 wherein the base includes a positive terminal relief surface and a negative terminal relief surface, and wherein the cap includes a positive pressing element and a negative pressing element, wherein the positive pressing element and the negative pressing element apply pressure to the positive lead and the negative lead to deflect the positive lead connection end and the negative lead connection end toward the positive terminal relief surface and the negative terminal relief surface, respectively.

3. The thermocouple apparatus of claim 1 wherein the positive terminal and the negative terminal are each split quadrilateral tubular receptacles.

4. The thermocouple apparatus of claim 1 further comprising:
   a thermocouple probe enclosing the positive and negative leads.

5. The thermocouple apparatus of claim 1 further comprising:
   an electrical connection wire including the positive lead and the negative lead.

6. The thermocouple apparatus of claim 1 further comprising:
   a first latch part provided on the cap; and
   a second latch part provided on the base, wherein the first latch part engages the second latch part to secure the cap to the base.

7. The thermocouple apparatus of claim 1 wherein the positive and negative lead connection ends are planar, and wherein the positive lead and the negative lead are received on the positive and negative lead connection ends, and wherein the positive and negative lead connection ends are deflected towards a positive terminal relief surface and a negative terminal relief surface, respectively.

8. The thermocouple apparatus of claim 7 further comprising:
   a one-way locking tooth protruding from each of the positive terminal and the negative terminal that engage a recess defined by the terminal header to prevent removal of the terminals.

9. The thermocouple apparatus of claim 1 wherein the positive terminal and the negative terminal each include a prong that extends from one side of the terminal header.

10. The thermocouple apparatus of claim 9 wherein the positive terminal and the negative terminal are each tubular receptacles that are disposed at least partially within the terminal header, wherein the tubular receptacles are each adapted to receive one of the prongs.

11. A thermocouple apparatus comprising:
   a probe;
   an electrical connection wire;
   a male connector and a female connector each including a one-piece body including a terminal header portion that defines a pair of openings on an interface end, a clam shell portion including a cap and a base hinged on one side to the cap, the cap and base defining an outer end opening when the cap is in a closed position with the cap closed over and contacting the base;
   a pair of terminal prongs each extending outwardly from one of a first pair of outer end openings defined by the terminal header of the male connector and being disposed partially within one of the pair of openings defined by the terminal header portion of the male connector, wherein the pair of terminal prongs extend into a cavity defined between the cap and the base of the clam shell portion;
   a pair of probe leads each extending from the probe to one of the pair of terminal prongs through the interface end opening and into the cavity of the male connector, wherein the cap connects each one of the pair of probe leads to one of the pair of terminal prongs when the cap is in the closed position;
   a pair of terminal receptacles being disposed partially within a second pair of interface end openings defined by the terminal header portion of the female connector, the pair of terminal receptacles extending into a cavity defined between the cap and the base of the clam shell portion of the female connector; and
   a pair of wiring leads of the electrical connection wire extending through a second outer end opening and into the cavity of the female connector, wherein the cap connects each one of the wiring leads to one of the terminal receptacles of the female connector when the cap is in the closed position.

12. The thermocouple apparatus of claim 11 wherein the pair of wiring leads of the electrical connection wire includes a positive lead and a negative lead, and wherein the base includes a positive terminal relief surface and a negative terminal relief surface, and wherein the cap includes a first pressing element that applies pressure to the positive lead, and deflects a positive lead connection end of the positive terminal toward the positive terminal relief surface, and wherein the second pressing element applies pressure to the negative lead, and deflects a negative lead connection end of the negative terminal toward the negative terminal relief surface.

13. The thermocouple apparatus of claim 11 further comprising:
   a first latch part provided on the cap; and
   a second latch part provided on the base, wherein the first latch part engages the second latch part to secure the cap to the base.

* * * * *